US012762679B2

(12) United States Patent
Chandrasekaran

(10) Patent No.: US 12,762,679 B2
(45) Date of Patent: Oct. 13, 2026

(54) DEFECT CHARACTERIZATION IN SEMICONDUCTOR DEVICES BASED ON IMAGE PROCESSING

(71) Applicant: MICRON TECHNOLOGY, INC., Boise, ID (US)

(72) Inventor: Nagasubramaniyan Chandrasekaran, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 200 days.

(21) Appl. No.: 18/388,623

(22) Filed: Nov. 10, 2023

(65) Prior Publication Data

US 2024/0161264 A1 May 16, 2024

Related U.S. Application Data

(60) Provisional application No. 63/425,444, filed on Nov. 15, 2022.

(51) Int. Cl.

| | |
|---|---|
| ***G06T 7/00*** | (2017.01) |
| ***G06V 10/25*** | (2022.01) |
| ***G06V 10/40*** | (2022.01) |
| ***G06V 10/764*** | (2022.01) |
| ***G06V 10/77*** | (2022.01) |
| ***G06V 10/774*** | (2022.01) |
| *G06V 20/50* | (2022.01) |

(52) U.S. Cl.

CPC ............ *G06T 7/0004* (2013.01); *G06V 10/25* (2022.01); *G06V 10/40* (2022.01); *G06V 10/764* (2022.01); *G06V 10/7715* (2022.01); *G06V 10/774* (2022.01); *G06T 2207/20081* (2013.01); *G06T 2207/30148* (2013.01); *G06V 20/50* (2022.01)

(58) Field of Classification Search

CPC ...... G06V 10/774; G06V 10/40; G06V 10/70; G06V 10/82; G06F 40/279; G06F 16/583

See application file for complete search history.

(56) References Cited

U.S. PATENT DOCUMENTS

| | | | | |
|---|---|---|---|---|
| 4,953,224 A * | 8/1990 | Ichinose | G06T 7/0006 | 348/125 |
| 5,774,222 A * | 6/1998 | Maeda | G01N 21/8806 | 250/548 |
| 2013/0108147 A1* | 5/2013 | Harada | G06T 7/0004 | 382/149 |
| 2013/0329039 A1* | 12/2013 | Sakai | G01N 21/956 | 348/126 |
| 2015/0369752 A1* | 12/2015 | Honda | G01N 21/9501 | 356/237.2 |
| 2017/0076435 A1* | 3/2017 | Park | G01N 21/9501 | |
| 2020/0105500 A1* | 4/2020 | Chou | H01J 37/153 | |
| 2020/0111206 A1* | 4/2020 | Yati | G06F 18/22 | |
| 2020/0150052 A1* | 5/2020 | Lee | G01N 21/8903 | |

(Continued)

*Primary Examiner* — Aaron W Carter

(74) *Attorney, Agent, or Firm* — Lowenstein Sandler LLP

(57) ABSTRACT

A system includes a memory and a processing device, operatively coupled with the memory, to perform operations including: receiving an image of a substrate of an electronic device; extracting, by a feature extraction model processing the image, a plurality of visual features from the image; and identifying, by a trainable feature classifier processing the plurality of visual features, a region of interest corresponding to an electronic circuit associated with performance of the electronic circuit.

19 Claims, 11 Drawing Sheets

(56) References Cited

U.S. PATENT DOCUMENTS

| | | | | |
|---|---|---|---|---|
| 2020/0272865 | A1* | 8/2020 | Niewczas | G06V 10/82 |
| 2022/0309637 | A1* | 9/2022 | Checka | G06N 3/094 |
| 2023/0049405 | A1* | 2/2023 | Yang | G01N 21/9501 |
| 2024/0161264 | A1* | 5/2024 | Chandrasekaran | G06T 7/0004 |
| 2025/0117754 | A1* | 4/2025 | Hao | G06V 10/89 |
| 2025/0322503 | A1* | 10/2025 | Zhao | G06T 7/0004 |
| 2025/0336053 | A1* | 10/2025 | Xiang | G06V 10/774 |

* cited by examiner

DEFECT CHARACTERIZATION IN SEMICONDUCTOR DEVICES BASED ON IMAGE PROCESSING

RELATED APPLICATIONS

This application claims the benefit of U.S. Provisional Patent Application No. 63/425,444, filed Nov. 15, 2022, the entire contents of which are incorporated by reference herein.

TECHNICAL FIELD

Embodiments of the disclosure relate generally to semiconductor processing, and more specifically, relate to defect characterization in semiconductor devices based on image processing.

BACKGROUND

Semiconductor processing typically includes forming a plurality of layers over a substrate such as a monocrystalline silicon wafer. The layers are typically processed through a combination of deposition, etching, and photo-lithographic techniques to include various integrated circuit components such as conductive lines, transistor gate lines, resistors, capacitors, and the like.

BRIEF DESCRIPTION OF THE DRAWINGS

The disclosure will be understood more fully from the detailed description given below and from the accompanying drawings of various embodiments of the disclosure.

DETAILED DESCRIPTION

Figure 1:
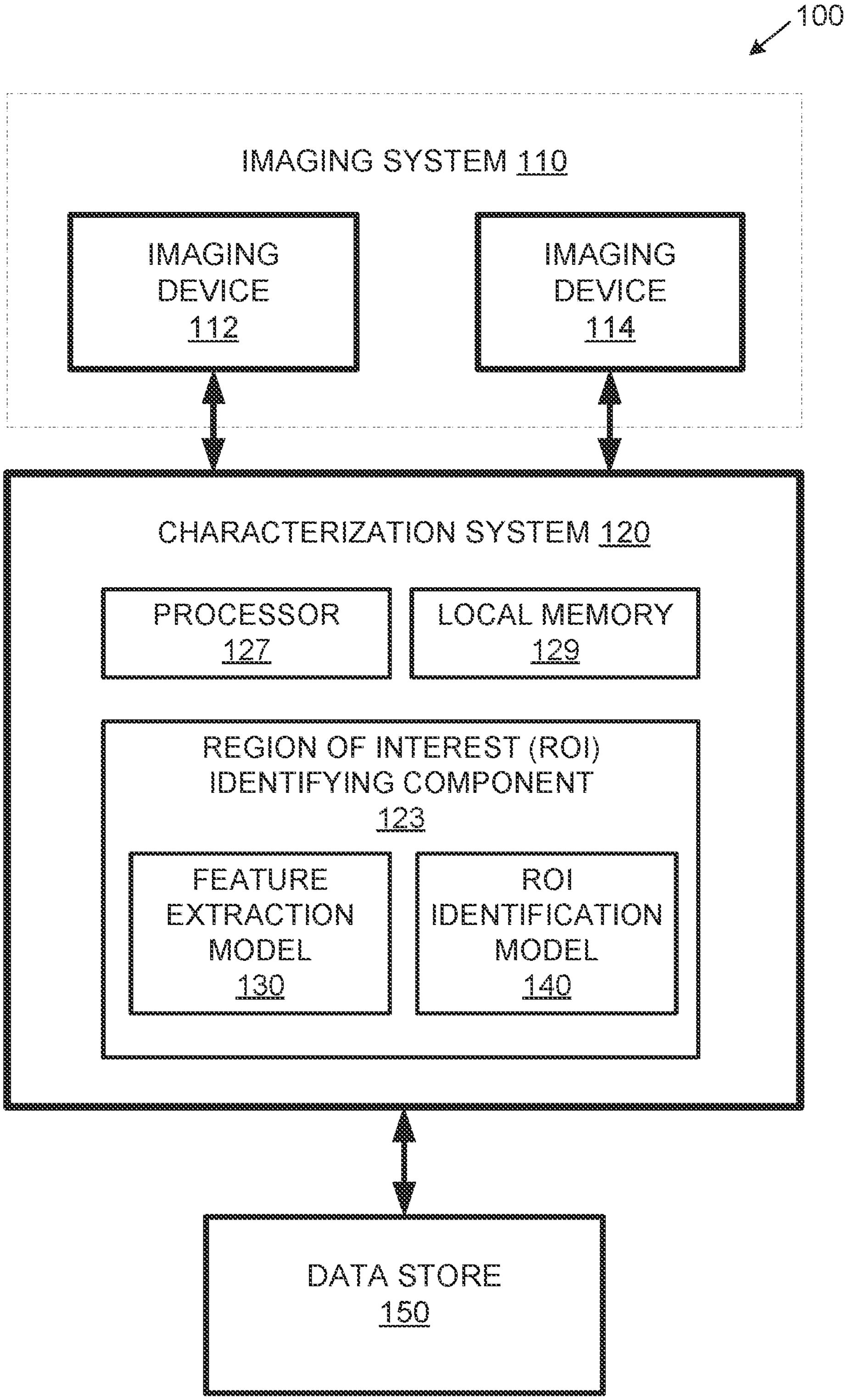
FIG. 1 illustrates an example system that includes an imaging system and a characterization system in accordance with some embodiments of the present disclosure.

Aspects of the present disclosure are directed to defect characterization in semiconductor devices based on image processing. A semiconductor substrate, defined as any supporting structure comprising semiconductive material, can include a semiconductive wafer (alone or in assemblies comprising other materials thereon) and conductive, non-conductive, and semiconductive layers (alone or in assemblies comprising other materials). Characterization of a semiconductor substrate can include critical measurements (e.g., of critical dimensions, overlay, thickness, plug recess, opens and shorts, electrical resistance and capacitance), such that each critical measurement can be calculated as an aggregated value over a certain area of the semiconductor substrate. Critical measurement may refer to a measurement at which the character of the measured item changes and can affect the final conformity of the semiconductor substrate to relevant specifications. Examples of critical measurements include critical dimension uniformity (CDU), local critical dimension uniformity (LCDU), line-edge roughness (LER), linewidth roughness (LWR), etc. In most cases, within a certain area of the semiconductor substrate, the majority of functional units (e.g., cells of a memory device) work well and only a minority of the functional units may exhibit abnormalities. The abnormalities may adversely affect the critical measurements because the aggregated value used for the critical measurements includes the values corresponding to the abnormalities. The aggregated value might mislead the user based on the number of abnormalities, for example, leading to a case of false positive or false negative. In some cases, performing critical measurements is often impractical to each part of the semiconductor substrate because of the substrate size, topology, number of measurements necessary, etc. In addition, semiconductor processing can cause defects that may not be known until a semiconductor substrate is incorporated in a final product and post-process metrology on the final product is performed. In some cases, these defects are hard to find because the dimensions of these defects are disproportionate to the inspected region of semiconductor substrate (e.g., a defect in the tail distribution, which means that the probability of the defect is low), and thus, repetitive processes are required to divide the area into a great number of sub-areas and examine each sub-area for the defects. The use of imaging devices for a tail-distribution-like defect or outlier in a large pool can be hindered by a significant time and cost required for collecting data for each area on a semiconductor substrate and analyzing each area, which represents a crucial bottleneck in efficient characterization of a semiconductor substrate.

Aspects of the present disclosure address the above-noted and other deficiencies by a characterization system capable of identifying, using image processing techniques, a region of interest (ROI) in an image of a semiconductor substrate, where the region of interest may be indicative of a potential outlier or defect, which may correspond to an electronic circuit on the semiconductor substrate exhibiting suboptimal performance.

An image processing technique may utilize one or more ROI identification models. The ROI identification model can identify a region (also called "region of interest") in an image by processing the visual features extracted from the image. The visual features are generally detected in the form of corners, blobs, edges, junctions, lines etc. The visual features can be extracted by a feature extraction model. In some embodiments, the ROI identification model can be represented by a trainable classifier. The ROI identification model can be trained on one or more training datasets.

In some implementations, a training dataset may include multiple training data items, such that each training data item includes a set of types and positions of visual features and corresponding locations of one or more regions of interest. During the training phase, the ROI identification model can process the set of visual features and output a predicted region of interest and compare the predicted region of interest with the labeled region of interest specified by the training metadata. Based on the comparison result, one or more parameters of the ROI identification model can be adjusted. More details regarding the training phase will be illustrated with respect to FIG. 4A. During the inference phase, the trained ROI identification model can receive, as an input, visual features extracted from the image (e.g., in the form of numeric vectors) and identify a region of interest that represent a potential outlier or a defect (e.g., a surface defect) on the semiconductor substrate, which may correspond to an electronic circuit exhibiting suboptimal performance (e.g., a hole or indentation). More details regarding the inference phase will be illustrated with respect to FIG. 3A.

In other implementations, instead of using visual features, a training dataset includes multiple images, such that each image is labeled with metadata specifying positions and types of visual features and corresponding locations and types of one or more regions of interest. During the training phase, the ROI identification model can process the set of images to output a predicted region of interest and compare the predicted region of interest with the labeled region of interest. The ROI identification model can then adjust, based on the comparison result, a parameter of itself, as a training result. More details regarding the training phase will be illustrated with respect to FIGS. 4B and 4C. During the inference phase, the trained ROI identification model can receive, as an input, the image and identify a region of interest that represent a potential outlier or a defect (e.g., a surface defect) on the semiconductor substrate, which may correspond to an electronic circuit exhibiting suboptimal performance (e.g., a hole or indentation). More details regarding the inference phase will be illustrated with respect to FIG. 3B.

In some embodiments, the characterization system according to the present disclosure can be used for improving critical measurements. In some cases, a critical measurement is measured through an imaging device that has a field of view, and the imaging device can obtain an image and output an average value over the field of view representing the critical measurement. As described above, the ROI identification model can use the image obtained from the imaging device and identify, on the semiconductor substrate, an electronic circuit exhibiting suboptimal performance, which is likely to have affected the average value representing the critical measurement, and allow corrective actions for the affected critical measurement. In some cases, similarly, as described above, the imaging device inspects only preset locations on the semiconductor substrate within the field of view to calculate the average value over the field of view representing the critical measurement. In such cases, the ROI identification model can determine candidate regions corresponding to the preset locations on the semiconductor substrate, and use the candidate regions (instead of using the whole image) to identify a region of interest. More details regarding the characterization system used for critical measurements will be illustrated with respect to FIG. 5.

In some embodiments, the characterization system according to the present disclosure can be used recursively, such that an identified region of interest can be re-imaged with a higher resolution to identify another region of interest within the earlier identified region of interest. For example, a lower resolution imaging device (e.g., an optical inspection system using light or laser beam, plasma sources) may be utilized to obtain a lower resolution image, in which one or more ROIs may be identified. Then, a higher resolution imaging device (e.g., atomic force microscope (AFM)) may inspect the identified first region of interest and obtain an image of the identified first region of interest, and the characterization system may identify a region of interest in the image of the identified first region of interest. The process can be iteratively performed until the identified region of interest needs no further identification (e.g., when the identified region of interest can be viewed clearly enough to make a determination for performing a corrective action). More details regarding the characterization system used iteratively will be illustrated with respect to FIG. 6.

In some implementations, the system according to the present disclosure can start with a large field of view (FOV) and the image analysis can zoom into a ROI. Large FOV allows more data collection at lower resolution, and once the system, using the method disclosed according to the present disclosure, has identified a ROI, the system can add additional images characterization to zoon into the ROI.

Advantages of the present disclosure include enabling efficient identification of regions of interest in an image of a substrate; the identified ROIs may correspond to one or more electronic circuits exhibiting suboptimal performance. The present disclosure presents a significant technical improvement in efficient characterization of a semiconductor substrate by reducing the time and cost for characterization. Furthermore, the methods and systems of the present disclosure may improve the accuracy of ROI detection, thus detecting outliers or defects that may not be identifiable by existing imaging devices.

FIG. 1 illustrates an example system 100 that includes an imaging system 110 and a characterization system 120 in accordance with some embodiments of the present disclosure. It can be noted that aspects of the present disclosure can be used for any type of semiconductor substrate. In the examples described herein, the semiconductor substrate that is examined by the system 100 includes a memory device, e.g., a solid-state drive (SSD), a dual in-line memory module (DIMM), a random access memory (RAM), such as dynamic random access memory (DRAM) and synchronous dynamic random access memory (SDRAM), or a negative-and (NAND) type flash memory.

The system 100 can be used for examination of a measurement/characterization area (e.g., of a semiconductor substrate and/or parts thereof) of the memory device. The examination can be a part of the product manufacturing and can be carried out during manufacturing the product or afterwards. In some examples, the measurement/characterization area may include several dies of the memory device. The imaging system 110 may include one or more imaging devices (e.g., imaging devices 112, 114). The imaging system 110 may obtain images of the measurement/characterization area and transmit to the characterization system 120. The characterization system 120 can process the received data and forward the types and positions of the identified region of interests to a defect management workflow, which may perform one or more corrective actions. The data store 150 can also store any data involved in the operations of system 100. Although not shown in FIG. 1, the system 100 may include additional storage, circuitry or components such as user interfaces, which are necessary for implementing the present disclosure.

The imaging device 112 may be configured to capture images of the measurement/characterization area (e.g., of a semiconductor substrate and/or parts thereof) at relatively low-speed and/or high-resolution. The imaging device 112 may include scanning electron microscope (SEM), atomic force microscope (AFM), voltage contrast inspection, and/or transmission electron microscopy (TEM). The imaging device 114 may be configured to capture images of the measurement/characterization area (e.g., of a semiconductor substrate and/or parts thereof) at relatively high-speed and/or low-resolution. The imaging device 114 may include optical inspection systems using light or laser beam, plasma sources, electron beam inspection systems using SEM or TEM, or inspection systems using AFM, infrared spectroscopy or other spectroscopic methods. The images captured by the imaging devices 112, 114 can be used for ROI identification as described below.

The imaging system 110 can be coupled to the characterization system 120 via a communication interface (e.g., a wired or wireless network interface). The characterization system 120 can be a computing system running one or more image processing applications described herein, including a processing device and a software stack executable by the processing device. For example, the characterization system 120 can include a processor 127 (e.g., processing device) configured to execute instructions stored in local memory 129. In the illustrated example, the local memory 129 of the characterization system 120 includes an embedded memory configured to store instructions for performing various processes, operations, logic flows, and routines that control operation of the characterization system 120, including handling communications between the imaging system 110 and the characterization system 120.

In the illustrated example, the local memory 129 of the characterization system 120 is configured to store instructions for performing various processes, operations, logic flows, and routines that control operation of the characterization system 120, including handling communications between the imaging system 110 and the characterization system 120.

The characterization system 120 includes a region of interest (ROI) identifying component 123 that is capable of identifying a region of interest in an image using image processing techniques. In some embodiments, the characterization system 120 includes at least a portion of the ROI identifying component 123. In some embodiments, the ROI identifying component 123 is part of the imaging system 110, an application, or an operating system. In some embodiments, the ROI identifying component 123 can have configuration data, libraries, and other information stored in the data store.

In some embodiments, the ROI identifying component 123 can receive, from the imaging system 110, instructions to perform a ROI identification. For example, the ROI identifying component 123 may receive, from the imaging device 114, a request for an additional ROI identification, for example, of a specific area of the semiconductor substrate.

The ROI identifying component 123 can receive an image from the imaging system 110. In some implementations, the image is received from the imaging device 112 or the imaging device 114. In some implementations, the ROI identifying component 123 may preprocess to reduce the size of the image by cropping the image, binarizing the image, filtering the image, segmenting the image, applying certain geometric transformations to the image, or identifying a plurality of regions in the image (instead of using the whole image) for the ROI identification.

Performing a ROI identification by the ROI identifying component 123 may involve identifying a region of interest in an image using a feature extraction model 130 and a ROI identification model 140. The ROI identification model 140 can identify a region (also called "region of interest") in an image based on features extracted in the image. Features are generally detected in the form of corners, blobs, edges, junctions, lines etc. In some implementations, the feature extraction model 130 is used to extract the features, and the feature extraction model 130 can be the fundamental scale, rotation and affine invariant feature-detectors such as Scale Invariant Feature Transform (SIFT), Speeded Up Robust Features (SURF), KAZE, Accelerated-KAZE (AKAZE), Oriented FAST and Rotated BRIEF (ORB), and Binary Robust Invariant Scalable Keypoints (BRISK). Other feature-detectors are also applicable, including trainable feature extraction models. In some implementations, the feature extraction model 130 is absent in that ROI identification model 140 incorporates a feature extraction function for use in training so that the ROI identification model 140 can identify the region of interest without a need of features extracted by the feature extraction model 130.

Figure 4A:
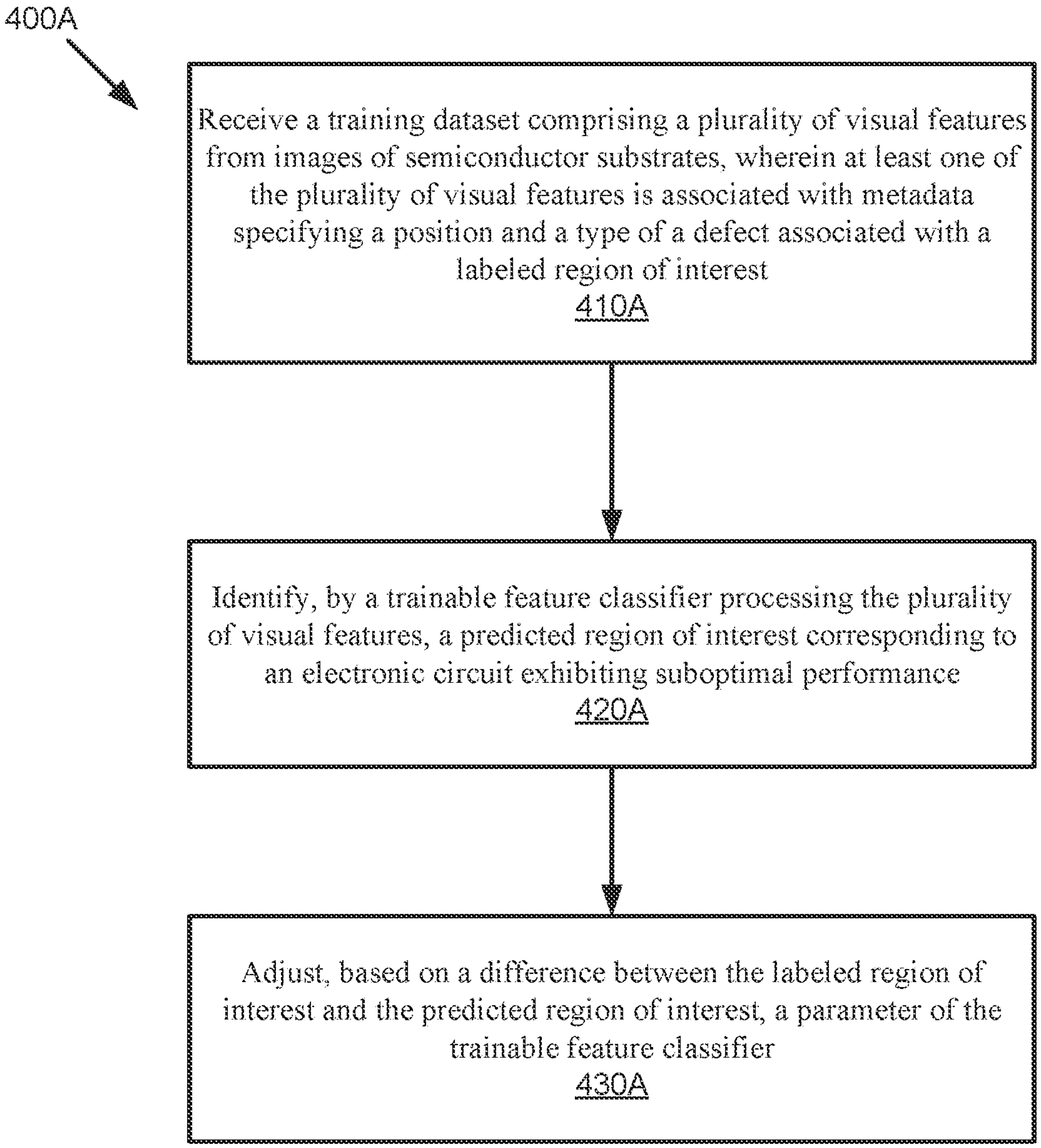
FIGS. 4A, 4B and 4C illustrate flow diagrams of example methods to train a model to identify a region of interest, in accordance with some embodiments of the present disclosure.
Figure 4B:
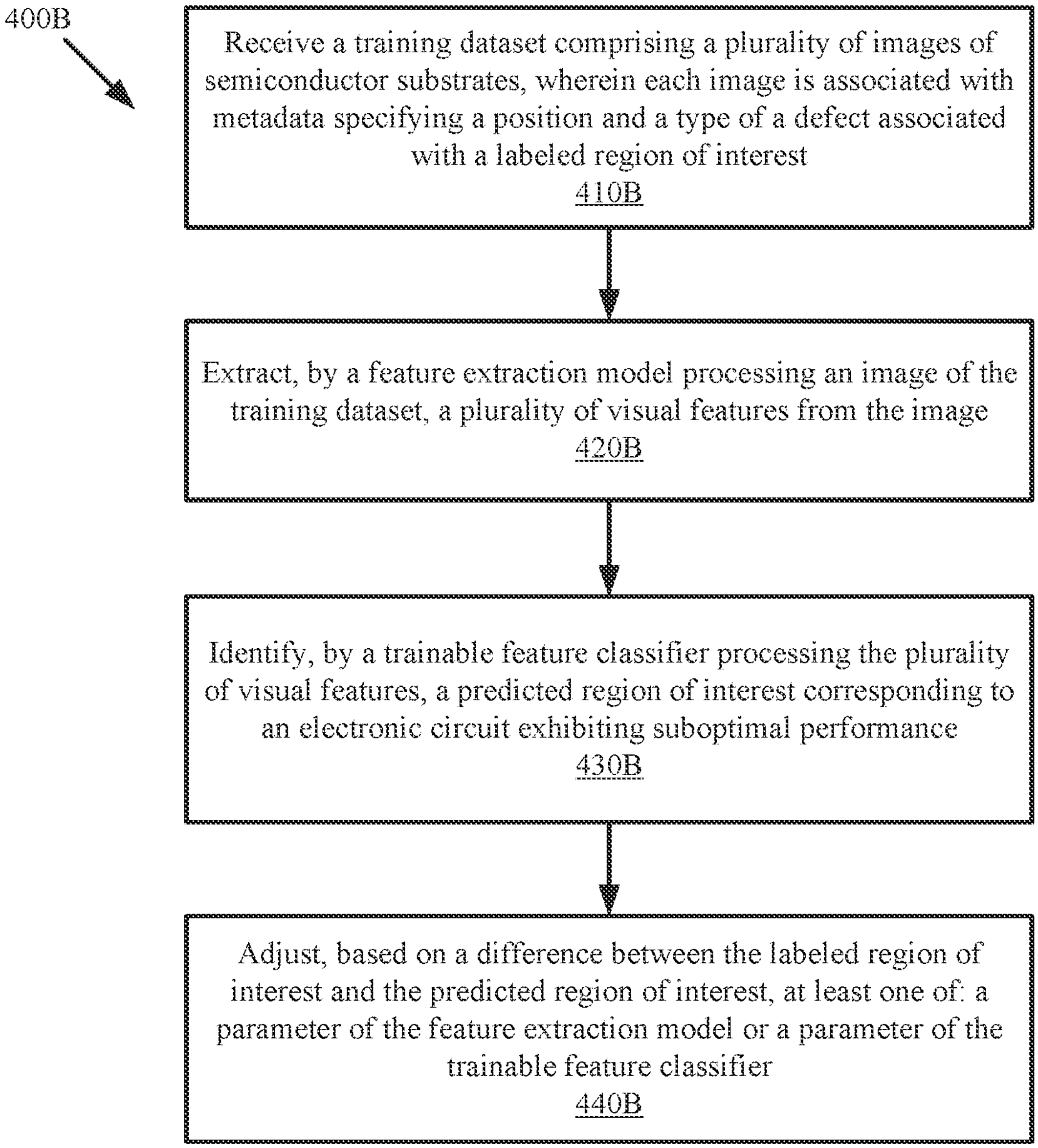
Figure 4C:
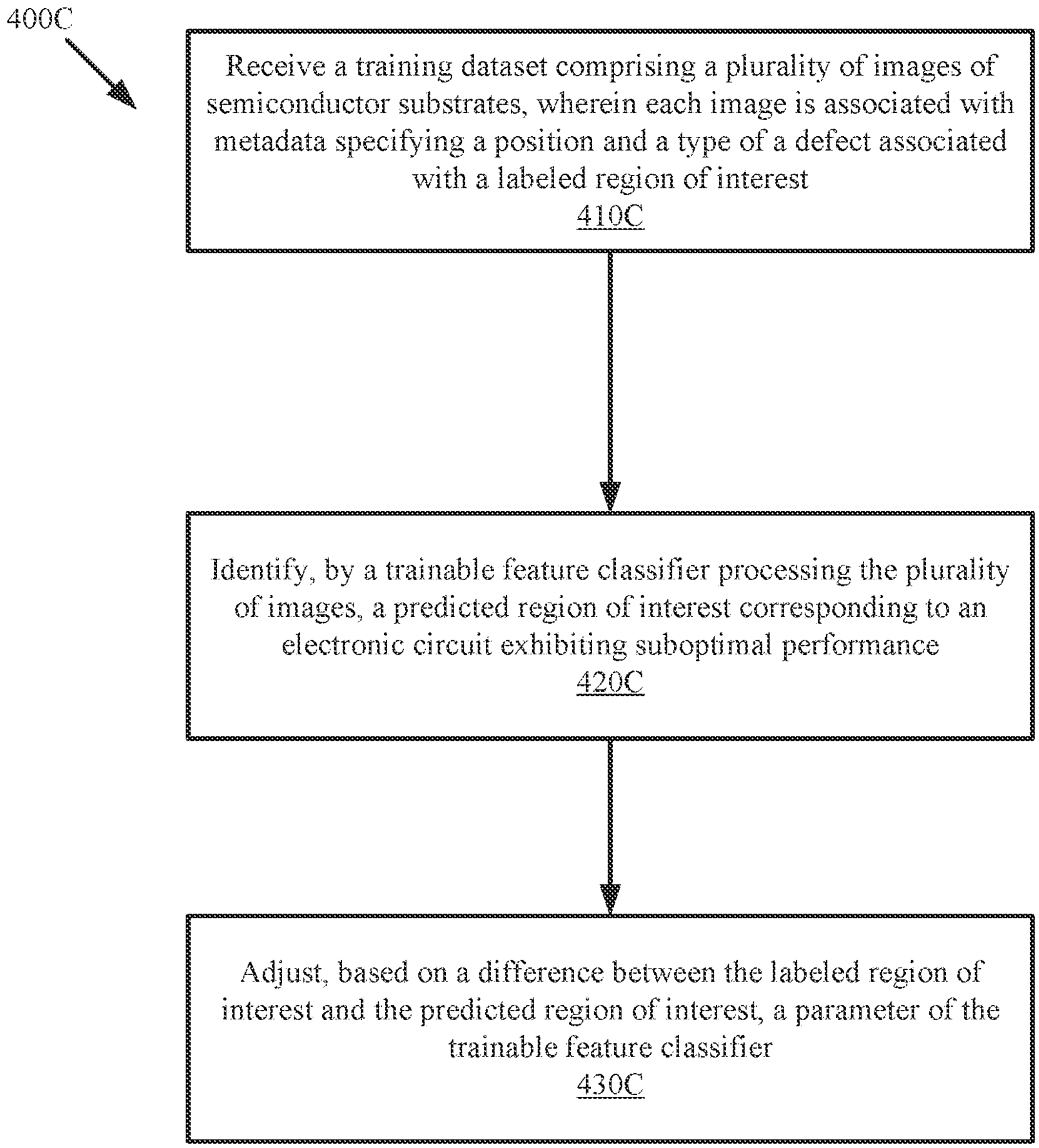
Figure 4D:
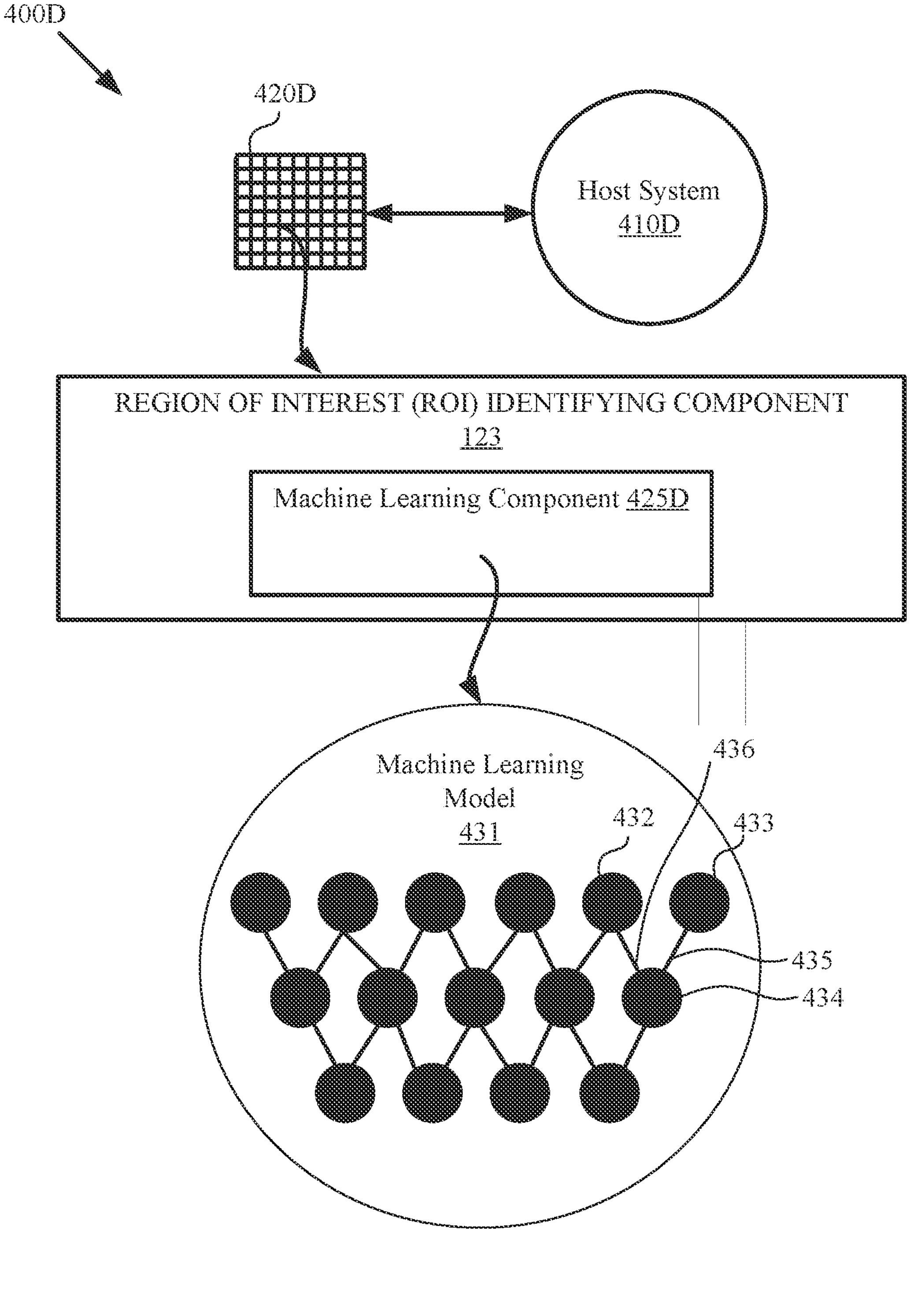
FIG. 4D illustrates an example computing environment that includes one or more memory components that include a ROI identifying component for training in accordance with some embodiments of the present disclosure.

In some embodiments, the ROI identification model 140 can be implemented by one or more neural networks as described in more detail with respect to FIG. 4D. The ROI identification model 140 can be trained on a number of datasets that may include datasets representing features. The ROI identification model 140 can be based on one or more machine learning models. The model(s) can include multiple neuron layers and can be trained prior to being installed in the characterization system 120. The model(s) can also be a learning model based on the image measured (or provided) or a reinforcement learning model.

To train the machine-learning model to detect regions failures, training datasets are generated, for example, by labeling of images (or visual features) with locations and types of ROIs, or by synthesizing images (or visual features) with certain locations and types of ROIs. During the training phase, the ROI identification model can process the set of images (or visual features) to output a predicted region of interest and compare the predicted region of interest with the labeled region of interest specified by the training metadata. Based on the comparison result, one or more parameters of the ROI identification model can be adjusted.

A training engine can further establish input-output associations between training inputs and the corresponding target output. In establishing the input-output associations, the training engine can use algorithms of grouping and clustering, such as the Density-based spatial clustering of applications with noise (DBSCAN) algorithm, or similar algorithms. As such, the ROI identification model 140 can develop associations between a particular set of images or visual features and a labeled region. Then, during identifying (testing) phase, the trained ROI identification model can receive, as an input, an image of the semiconductor substrate or features extracted from the image, and identify, as an output, regions of interest that represent a potential outlier or a defect on the semiconductor substrate.

In some implementations, the ROI identification model 140 may utilize only training datasets with similarity to the semiconductor substrate being examined, such as training datasets of semiconductor substrates having the same type as the target semiconductor substrate being tested. For example, a model intended to test a target DRAM memory device is trained using data for similar DRAM memory devices.

Figure 2A:
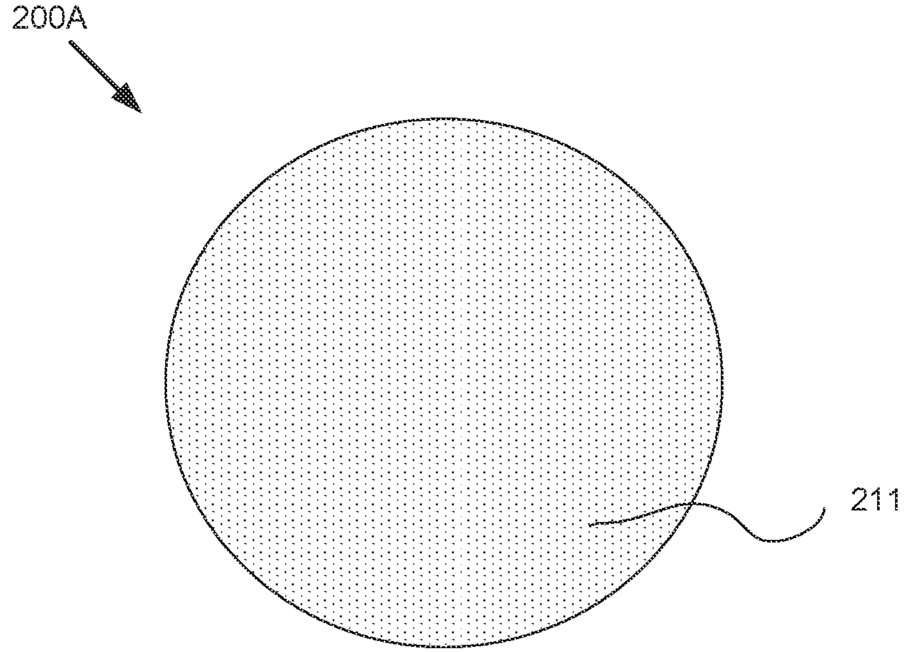
FIGS. 2A and 2B illustrate schematically sections of exemplified examined images with regions.
Figure 2B:
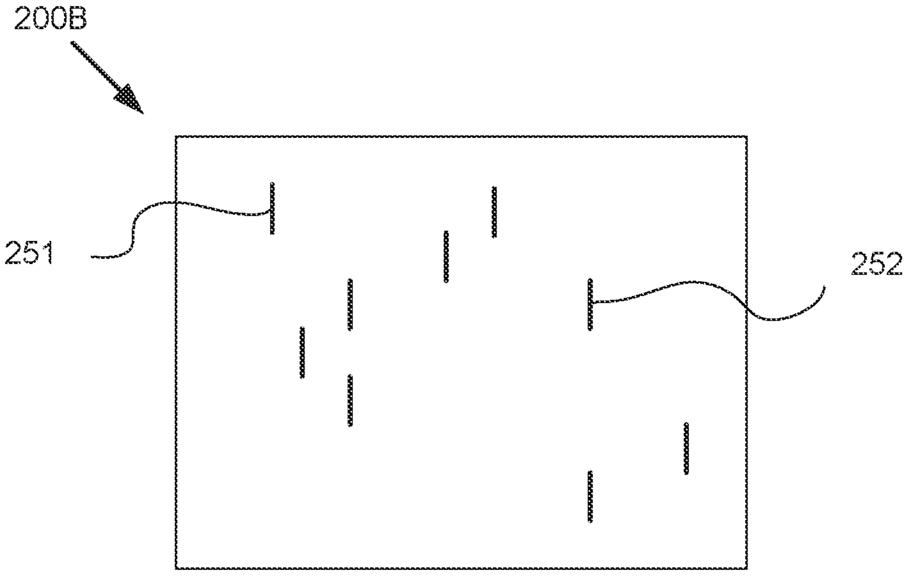

FIGS. 2A and 2B schematically illustrate two exemplified two-dimensional images with multiple regions of a semiconductor substrate. Referring to FIG. 2A, the image 200A includes multiple regions, each region represented by a dot.

The image 200A may be generated by a device (e.g., imaging device 112 or imaging device 114). The regions within the image 200A may follow a pattern that each region has a fixed distance with one another. The ROI identifying component 123 may identify a region of interest (e.g., dot 211) among the multiple patterned regions. Referring to FIG. 2B, the image 200B includes multiple regions, each region represented by a line. The image 200B may be generated by a device (e.g., imaging device 112 or imaging device 114). The regions within the image 200B may have locations where each location is specified according to a type of the semiconductor substrate. The ROI identifying component 123 may identify two regions of interest (e.g., line 251, line 252) among the multiple regions. It is noted that images and regions in FIGS. 2A and 2B are illustrated as an example, the images can include three-dimensional images and can be in various sizes and/or shapes, and the regions can also include three-dimensional regions and can be in various sizes and/or shapes.

Figure 3A:
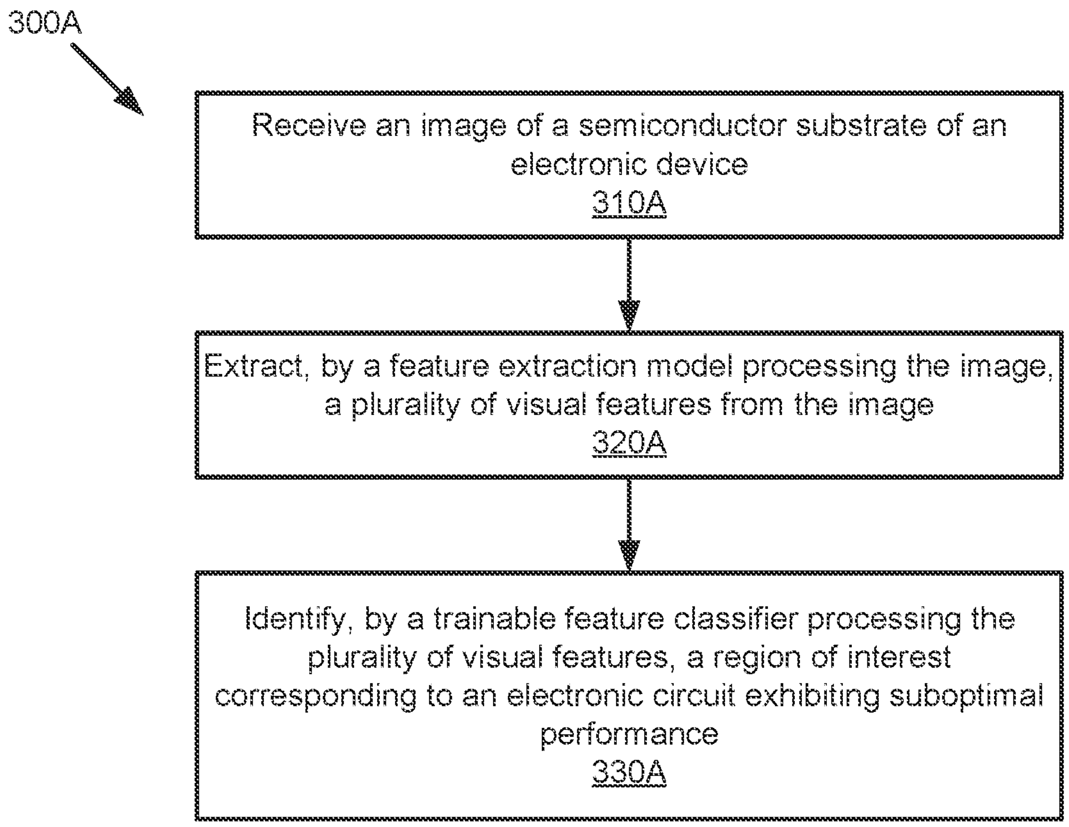
FIGS. 3A and 3B illustrate flow diagrams of example methods to identify a region of interest (ROI) of a semiconductor substrate, in accordance with some embodiments of the present disclosure.
Figure 3B:
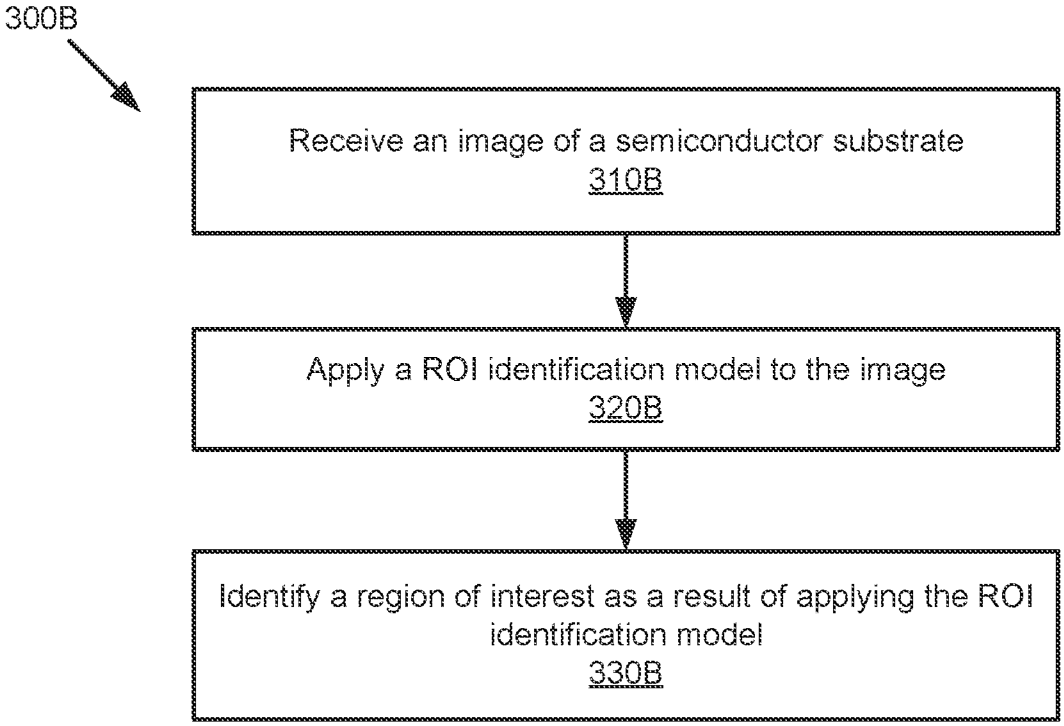

FIGS. 3A and 3B illustrate flow diagrams of example methods 300A and 300B of identifying a region of interest in a semiconductor substrate, in accordance with some embodiments of the present disclosure. In one embodiment, the ROI identifying component 123 can perform the example methods 300A and 300B, based on instructions stored in the embedded memory of the local memory 129. In some embodiments, the firmware of the characterization system 120 can perform the example methods 300A and 300B. In some embodiments, an outside processing device, such as the processing device of the imaging system 110, can perform the example methods 300A and 300B.

The methods 300A and 300B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular order, unless otherwise specified, the order of the operations can be modified. Thus, the illustrated embodiments should be understood only as examples, and the illustrated operations can be performed in a different order, with some operations can be performed in parallel. Additionally, one or more operations can be omitted in various embodiments. Thus, not all operations of the methods 300A and 300B are required in every embodiment. Other operations flows are possible. In some embodiments, different operations can be used.

FIG. 3A illustrates a case that visual features are extracted from an image of the semiconductor substrate first, for example, by a separate feature extraction model (e.g. feature extraction model 130), and a ROI identification model (e.g., ROI identification model 140) use the extracted visual features to identify a region of interest in the image; while FIG. 3B illustrates a case that a ROI identification model (e.g., ROI identification model 140) uses the image without having a separate feature extraction model to identify a region of interest in the image.

Referring to FIG. 3A, at operation 310A, the processing logic receives an image of a semiconductor substrate of an electronic device. The image is received from an imaging device. In some implementations, the imaging device, e.g., scanning electron microscope (SEM) or atomic force microscopy (AFM), can obtain the image and send it to the processing logic. The image may cover an area of the semiconductor substrate, and the area may be in accordance with the field of view of the imaging device. In some implementations, the imaging device, e.g., an optical inspection system, low-resolution SEM, a broadband plasma tool, can inspect an area of the semiconductor substrate, obtain an image as a result of inspection, and send it to the processing logic. In some implementations, the processing logic may preprocess the image. The preprocessing operations may include, e.g., cropping the image, binarizing the image, filtering the image, segmenting the image, applying certain geometric transformations to the image, etc.

In some implementations, the processing logic may preprocess the image to reduce the size of the image by identifying multiple candidate regions in the image (instead of using the whole image) for the ROI identification. For example, the candidate regions may have specific locations on the semiconductor substrate based on the type or the usage of the semiconductor substrate. In some implementations, the ROI identifying component 123 may define the multiple candidate regions according to information received with the image. In some examples, the ROI identifying component 123 may determine the multiple candidate regions according to sampling information associated with a critical measurement. For example, for a specific critical measurement, sampling locations on the semiconductor substrate are used to perform the measurement that the values measured in these locations are used for calculating the average value thereof representing the critical measurement. In some examples, the ROI identifying component 123 may determine the multiple candidate regions according to a result (including multiple regions requiring attention or further inspection) from the imaging device 114.

At operation 320A, the processing logic extracts, by a feature extraction model processing the image, a plurality of visual features from the image. The feature extraction model may use the fundamental scale, rotation and affine invariant feature-detectors such as SIFT, SURF, KAZE, AKAZE, ORB, and BRISK. Other feature-detectors are also applicable. The feature extraction model detects and isolates various visual features. Features are generally detected in the form of corners, blobs, edges, junctions, lines etc. In some implementations, the processing logic examines every pixel to determine if there is a feature present at that pixel. In some implementations, the processing logic extracts various visual features to form a feature image.

At operation 330A, the processing logic identifies, by a trainable feature classifier processing the plurality of visual features, a region of interest corresponding to an electronic circuit exhibiting suboptimal performance. The trainable feature classifier may discover regularities in data (e.g., the plurality of visual features) and use the regularities to classify the data into different categories to identify a region of interest. The trainable feature classifier can include Perceptron, Naive Bayes, Decision Tree, Logistic Regression, K-Nearest Neighbor, Artificial Neural Networks, Deep Learning, Support Vector Machine, or any applicable classifier. In some implementations, the trainable feature classifier can involve machine learning that requires training.

The trainable feature classifier can be trained on a number of datasets that may include datasets representing semiconductor substrate features and a region of interest corresponding to an electronic circuit exhibiting suboptimal performance. During a training phase, the trainable feature classifier can develop associations between a particular set of visual features and a region of interest. Then, during an identifying phase, the trainable feature classifier can receive, as a testing input, the visual features extracted at operation 320A, and identify, as a testing output, regions of interest that represent a potential outlier or a defect on the semiconductor substrate. The potential outlier or defect on the semiconductor substrate may correspond to an electronic circuit exhibiting suboptimal performance. In some implementations, the processing logic determines, by a trainable defect classification model processing a subset of the plurality of visual features associated with the region of interest, a type of a defect associated with the electronic circuit.

Referring to FIG. 3B, at operation 310B, the processing logic receives an image of a semiconductor substrate, which can be the same as or similar to operation 310A.

At operation 320B, the processing device applies a ROI identification model to the image. At operation 330B, the processing device identifies a region of interest as a result of applying the ROI identification model at operation 320B. The processing device can further communicate with other imaging devices to confirm that the identified region of interest includes a defect, and take actions accordingly.

The ROI identification model here includes a trainable feature classifier processing the plurality of images, a region of interest corresponding to an electronic circuit exhibiting suboptimal performance. The trainable feature classifier may discover regularities in data (e.g., the plurality of images) and use the regularities to classify the data into different categories to identify a region of interest. The trainable feature classifier can include Perceptron, Naive Bayes, Decision Tree, Logistic Regression, K-Nearest Neighbor, Artificial Neural Networks, Deep Learning, Support Vector Machine, or any applicable classifier. In some implementations, the trainable feature classifier can involve machine learning that requires training.

The trainable feature classifier can be trained on a number of datasets that may include datasets representing semiconductor substrate images and a region of interest corresponding to an electronic circuit exhibiting suboptimal performance. During a training phase, the trainable feature classifier can develop associations between a particular set of images and a region of interest. Then, during an identifying phase, the trainable feature classifier can receive, as a testing input, the image received at operation 310B, and identify, as a testing output, regions of interest that represent a potential outlier or a defect on the semiconductor substrate. The potential outlier or defect on the semiconductor substrate may correspond to an electronic circuit exhibiting suboptimal performance.

In some implementations, the process in methods 300A and 300B can be recursively performed by obtaining an image of the identified region of interest that is similar to operation 310A or 310B and continues to operations 320A or 320B, 330A or 330B to identify a further region of interest like a zoomed-in way. In some implementations, the feature extraction model, feature classifier, or ROI identification model used for the image of the semiconductor substrate and the image of the identified region of interest are different, for example, using different feature detectors, using different training data, using different machine learning methods, etc.

FIGS. 4A, 4B, and 4C illustrate training models for identifying a region of interest, in accordance with some embodiments of the present disclosure. In some embodiments, a separate training engine can perform the example methods 400A and 400B. In some embodiments, the ROI identifying component 123 can perform the example methods 400A, 400B, and 400C, based on instructions stored in the embedded memory of the local memory 129. In some embodiments, the firmware of the characterization system 120 can perform the example methods 400A, 400B, and 400C. In some embodiments, an outside processing device, such as the processing device of the imaging system 110, can perform the example methods 400A, 400B, and 400C and implement the trained model in the characterization system 120.

The methods 400A, 400B, and 400C can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular order, unless otherwise specified, the order of the operations can be modified. Thus, the illustrated embodiments should be understood only as examples, and the illustrated operations can be performed in a different order, with some operations can be performed in parallel. Additionally, one or more operations can be omitted in various embodiments. Thus, not all operations of the methods 400A, 400B, and 400C are required in every embodiment. Other operations flows are possible. In some embodiments, different operations can be used.

FIG. 4A illustrates a flow diagram of an example method 400A to train a model using a set of visual features that have been extracted for identifying a region of interest among a plurality of regions, in accordance with some embodiments of the present disclosure; while FIGS. 4B and 4C illustrate flow diagrams of example methods 400B and 400C to train a model using a set of images without prior extracting features for identifying a region of interest, in accordance with some embodiments of the present disclosure.

Referring to FIG. 4A, at operation 410A, the processing logic receives a training dataset. The training dataset includes a plurality of visual features from images of semiconductor substrates, and at least one of the plurality of visual features is associated with metadata specifying a position and a type of a defect associated with a labeled region of interest. The training data may be specific to a semiconductor substrate, a type of the semiconductor substrate, a set of the semiconductor substrates, etc. For example, the data for all DRAM memory devices may be collected as training data for any DRAM memory device. In another example, the data for all DRAM memory devices in the same size may be collected as training data for any DRAM memory device in that size.

Obtaining training data can involve obtaining a plurality of visual features. For example, the feature extraction model 130 can extract the plurality of visual features from images of semiconductor substrates. Obtaining training data can involve obtaining a target output including a position and a type of a defect associated with a region of interest.

At operation 420A, the processing logic identifies, by a trainable feature classifier processing the plurality of visual features, a predicted region of interest corresponding to an electronic circuit exhibiting suboptimal performance.

To generate the trainable feature classifier, the processing logic can process the training input (i.e., the plurality of visual features) through a neural network-based model, which includes one or more neural networks. Each neural network can include multiple neurons that are associated with learnable weights and biases. The neurons can be arranged in layers. The neural network model can process the training input through one or more neuron layers and generate a training output, which is described in more details with respect to FIG. 4D.

In some implementations, the trainable feature classifier classifies each of the plurality of visual features as to whether or not it falls in a region of interest. In some implementations, the visual features are compared to the feature that is deemed as good indicating it does not lead to a failure of the device and the feature that is deemed as bad indicating it may lead to failure of the device. Such classification of “good” or “bad” features can be trained and reinforced. In some implementations, the trainable feature classifier classifies each of the plurality of visual features to a class corresponding to a likelihood of a visual feature falling in a region of interest. The likelihood can be a numerical value, such as 20%, 65%, and so on. As an illustrative example, in class number 1, the likelihood of a visual feature falling in a region of interest is 90%-99%, in class number 2, the likelihood of a visual feature falling in a region of interest is 80%-89%, and so on. In each class, a plurality of sub-class can also be implemented. In some implementations, the target output can include a target likelihood (e.g., a probability) that a visual feature falls in a region of interest. For example, the target output includes all features that fall in a region of interest having a likelihood of 80%-99%. In some implementations, a region of interest can also be associated with or indicate the likelihood of failure. Whether an image has some failure can be trained based on electrical data and experience data, which can be provided as input.

At operation 430A, the processing logic adjusts, based on a difference between the labeled region of interest and the predicted region of interest, a parameter of the trainable feature classifier. The processing logic can determine a difference between the model output (i.e., the predicted region of interest output from the trainable feature classifier) and the expected (or target) output (i.e., the labeled region of interest extracted from the metadata of the training dataset).

In some implementations, determining a difference between the labeled region of interest and the predicted region of interest may involve determining the distance between the positions satisfying a threshold criterion. For example, the threshold criterion may specify a maximum distance (e.g., 0.5 nanometer) between the regions. In some implementations, determining a difference between the labeled region of interest and the predicted region of interest may involve determining whether the types of defects associated with the regions are the same.

Having determined the difference, the processing device can modify (adjust) parameters of the neural network model based on the determined difference. Modification of the parameters (e.g., weights, biases, etc., of the neural connections) of the neural network model can be performed, in one exemplary embodiment, by methods of backpropagation. For example, the parameters can be adjusted to minimize the difference between the target outputs and the predicted outputs generated by the neural network. As such, the processing logic may generate a model to identify a region of interest of an image.

Referring to FIG. 4B, at operation 410B, the processing logic receives a training dataset comprising a plurality of images of semiconductor substrates, wherein each image is associated with metadata specifying a position and a type of a defect associated with a labeled region of interest. In some implementations, the plurality of images of semiconductor substrates are related to the same type of a semiconductor substrate. The labeled region of interest may serve as a target output of a model of identifying the region of interest. The model of identifying the region of interest may include a feature extraction model and a trainable feature classifier as described below.

At operation 420B, the processing logic extracts, by a feature extraction model processing an image of the training dataset, a plurality of visual features from the image. The operation 420B may be the same as or similar to the operation 320A, except that the feature extraction model in operation 420B can be trained or adjusted.

At operation 430B, the processing logic identifies, by a trainable feature classifier processing the plurality of visual features, a predicted region of interest corresponding to an electronic circuit exhibiting suboptimal performance. The operation 430B may be the same as or similar to the operation 420A.

At operation 440B, the processing logic adjusts, based on a difference between the labeled region of interest and the predicted region of interest, at least one of: a parameter of the feature extraction model or a parameter of the trainable feature classifier. The operation 430B may be the same as or similar to the operation 430A, except that adjustment can involve parameters of the feature extraction model and/or the trainable feature classifier based on the determined difference.

Referring to FIG. 4C, at operation 410C, the processing logic receives a training dataset comprising a plurality of images of semiconductor substrates, wherein each image is associated with metadata specifying a position and a type of a defect associated with a labeled region of interest. The operation 410C may be the same as or similar to the operation 410B.

At operation 420C, the processing logic identifies, by a trainable feature classifier processing the plurality of images, a predicted region of interest corresponding to an electronic circuit exhibiting suboptimal performance. The operation 430B may be the same as or similar to the operation 420A, except that a set of images are used instead of a set of visual features as training input.

At operation 430C, the processing logic adjusts, based on a difference between the labeled region of interest and the predicted region of interest, a parameter of the trainable feature classifier. The operation 430C may be the same as or similar to the operation 430A.

FIG. 4D illustrates an example computing environment that includes one or more memory components that include a ROI identifying component and a machine learning component in accordance with some embodiments of the present disclosure. In general, the memory component 420D can correspond to a memory device. For example, the memory component 420D can be a volatile memory component or a non-volatile memory component. The memory component 420D can include a ROI identifying component 123 of FIG. 1. The ROI identifying component 123 can include a machine learning component 425D that can perform machine learning operations to identify a region of interest.

In some embodiments, the machine learning operations can include the processing of data by using a machine learning model 431 to classify the data, make identification, or any other type of output result. The machine learning model 431 can represent a ROI identification model 140 (as illustrated with FIG. 4A or FIG. 4C) or represent a combination of a feature extraction model 130 and a ROI identification model 140 (as illustrated with FIG. 4B). The machine learning model 431 can be based on, but is not limited to, neural networks such as spiking neural networks, deep neural networks, etc. or another type of machine learning model. As an example, the machine learning operation can correspond to the use of a machine learning model to process input image data to classify or identify an object or subject of the input image data. In some embodiments, the machine learning model can be a neural network that is represented by a group of nodes (i.e., neurons) that are connected with other nodes. The connection between a pair of nodes can be referred to as an edge. For example, a node 432 and another node 433 can be connected to a third node 434 with edges 435 and 436. Each edge in the neural network can be assigned a weight that is identified as a numerical number. Input data (e.g., the data to be processed) can be provided to a node and can then be processed based on the weight of a connecting edge. For example, a value of a weight of an edge can be multiplied with input data of the node and the node at the end of the edge can accumulate multiple values. As an example, the node 432 can receive an input data and the node 433 can receive another input data (e.g., pixel bit values associated with an image). The particular weight value assigned to the edge 436 can be combined (e.g., multiplied or other such operation) with the input data provided to the node 432 to generate an output value and another weight value assigned to the edge 435 can be combined (e.g., multiplied) with the other input data provided to the node 433 to generate another output value. The output values can then be combined (e.g., accumulated) at the node 434 to generate a combined output value. The combined output value from the node 434 can be combined or multiplied with another weight assigned to a next edge and accumulated at a next node. For example, the machine learning model 431 can include nodes grouped into multiple layers. Signals (e.g., input data and intermediate data) can propagate through the layers until a last layer (i.e., the final output layer) that generates the output results of the machine learning operation. As previously described, the input data and other such intermediate data from nodes are multiplied with weights of edges and then accumulated at other nodes at the end or destination of the edges. As such, the machine learning operation can include layers or a series of multiplication and accumulation (MAC) sub-operations.

Figure 5:
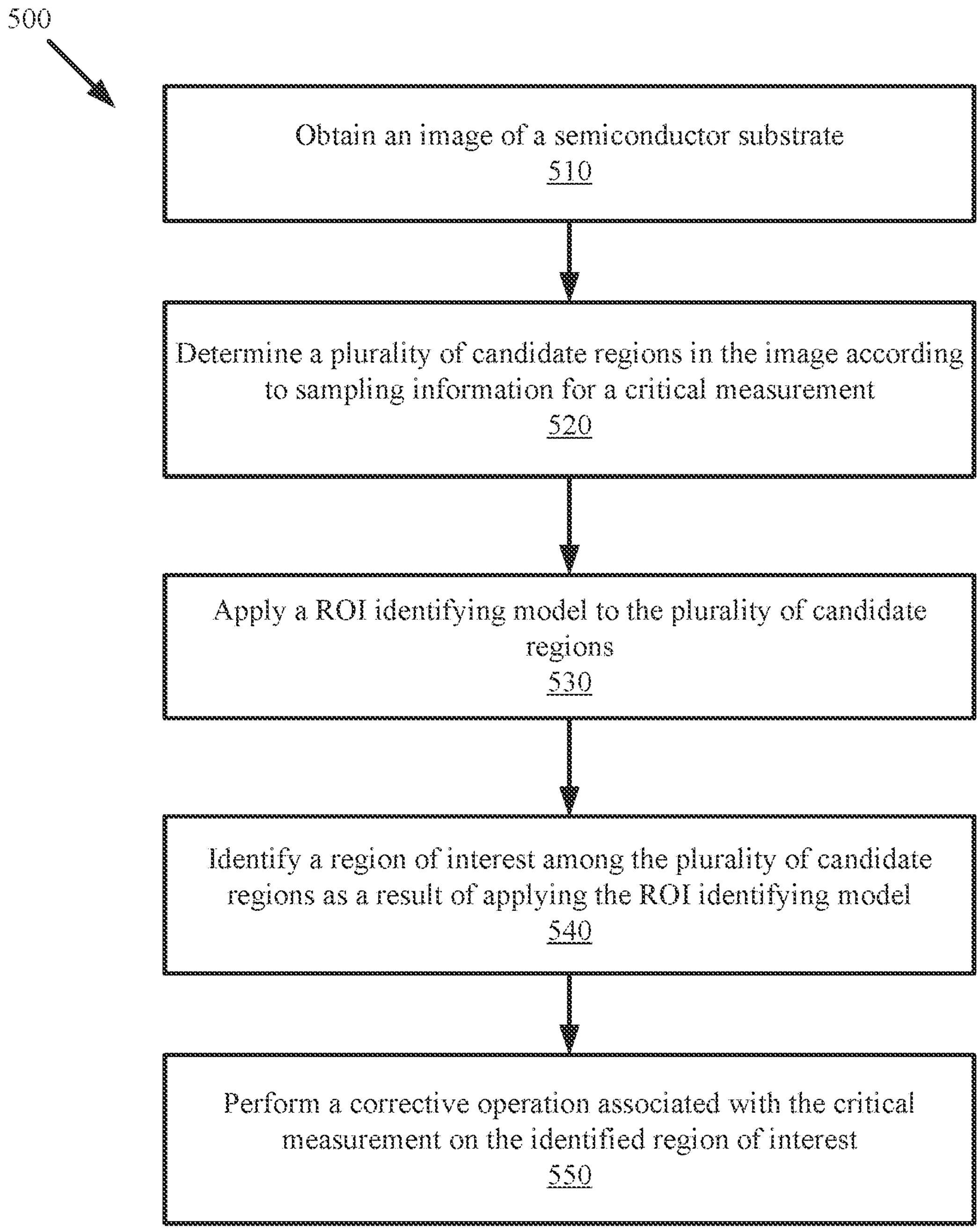
FIG. 5 illustrates a flow diagram of an example method to use the region of interest characterization for a critical measurement, in accordance with some embodiments of the present disclosure.
Figure 6:
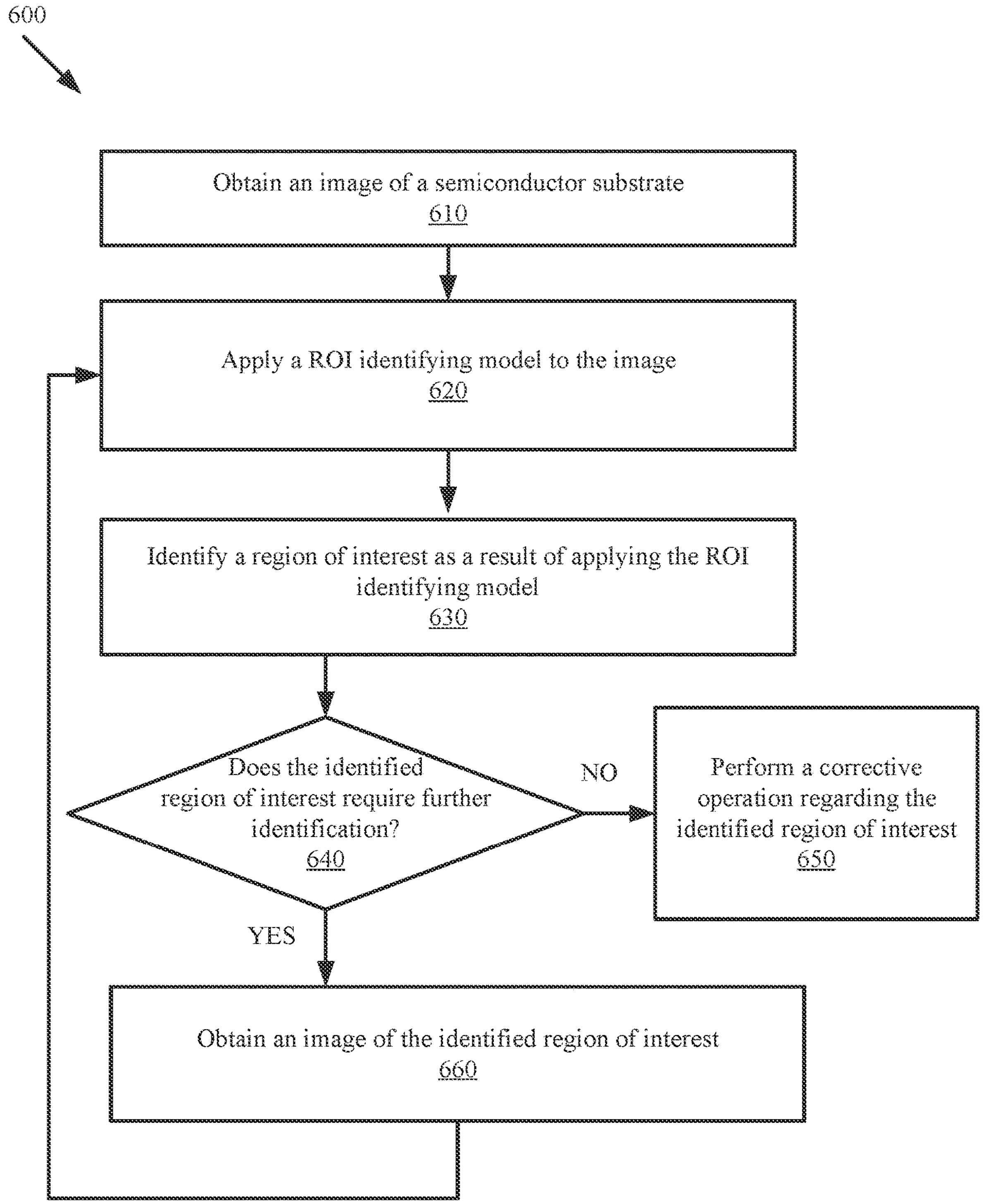
FIG. 6 illustrates a flow diagram of an example method to use the region of interest characterization recursively, in accordance with some embodiments of the present disclosure.

FIGS. 5 and 6 illustrate methods 500, 600, respectively. The methods 500, 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular order, unless otherwise specified, the order of the operations can be modified. Thus, the illustrated embodiments should be understood only as examples, and the illustrated operations can be performed in a different order, with some operations can be performed in parallel. Additionally, one or more operations can be omitted in various embodiments. Thus, not all operations of the methods 500, 600 are required in every embodiment. Other operations flows are possible. In some embodiments, different operations can be used.

FIG. 5 illustrates a flow diagram of an example method 500 to identify a region of interest in a semiconductor substrate used for a critical measurement, in accordance with some embodiments of the present disclosure. FIG. 6 illustrates a flow diagram of an example method 600 to identify a region of interest in a semiconductor substrate used recursively, in accordance with some embodiments of the present disclosure. In one embodiment, the ROI identifying component 123 can perform the example methods 500, 600, based on instructions stored in the embedded memory of the local memory 129. In some embodiments, the firmware of the characterization system 120 can perform the example methods 500, 600. In some embodiments, an outside processing device, such as the processing device of the imaging system 110, can perform the example methods 500, 600.

Referring to FIG. 5, at operation 510, the processing logic obtains an image of a semiconductor substrate, which can be the same as or similar to operation 310B.

At operation 520, the processing logic determines a plurality of candidate regions in the image according to sampling information for a critical measurement. For example, for a specific critical measurement, sampling locations on the semiconductor substrate are used to perform the measurement that the values measured in these locations are used for calculating the average value thereof representing the critical measurement. In some implementations, the processing logic may determine the candidate regions following a pattern, in which the regions are located at a predetermined distance from each other. In some implementations, the processing logic may determine the candidate regions being placed at specific locations on the semiconductor substrate based on the type (e.g., DRAM) or the usage (e.g., memory) of the semiconductor substrate. In an illustrative example, for a critical measurement of thickness, the regions may be preset having fixed spacing, and for a critical measurement of plug recess, the candidate regions may be preset at specific locations relative to one another.

At operation 530, the processing logic applies a ROI identification model to the plurality of candidate regions, and at operation 540, the processing logic identifies a region of interest among the plurality of candidate regions as a result of applying the ROI identification model. Operations 430 and 540 can be the same as or similar to operations 320B and 330B, respectively, except that the ROI identification model represented by the trainable classifier is applied to each candidate region. The ROI identification model may classify each candidate region to a class corresponding to a likelihood of the region being the ROI, and then identify, for example, a candidate region having the max likelihood as the region of interest.

At operation 550, the processing logic performs a corrective operation associated with the critical measurement on the identified region of interest. The corrective operation may include a further inspection of the identified region of interest with respect to the critical measurement, excluding the identified region of interest from calculation of the critical measurement, compensating the offset of the critical measurement caused by the identified region of interest, etc.

Referring to FIG. 6, at operation 610, the processing logic obtains an image of a semiconductor substrate, which can be the same as or similar to operation 310B.

At operation 620, the processing logic applies a ROI identification model to the plurality of regions, which can be the same as or similar to operation 320B.

At operation 630, the processing logic identifies a region of interest as a result of applying the ROI identification model, which can be the same as or similar to operation 330B.

At operation 640, the processing logic determines whether the identified region of interest requires a further identification (ROI identifying). For example, the processing logic may request other imaging devices to inspect the identified region of interest to determine whether the identified region of interest requires a further identification (ROI identifying).

At operation 650, responsive to determining that the identified region of interest does not require a further identification (ROI identifying), the processing logic performs a corrective operation regarding the identified region of interest, which can be the same as or similar to operation 550.

At operation 660, responsive to determining that the identified region of interest requires a further identification (ROI identifying), the processing logic obtains an image of the identified region of interest. The process of obtaining the image of the identified region of interest may be the same as or similar to operation 310B. In some implementations, different devices are used for obtaining the image at operation 610 and operation 660. The process continues back to operation 620. Thus, the method 600 will continue until a final region of interest is identified without a need of further identification. In some implementations, a first (i.e., prior) ROI identification model and a second (i.e., subsequent) ROI identification model each includes a feature extraction model processing an image and a trainable feature classifier processing a plurality of visual features in the image. In some implementations, the first ROI identification model and the second ROI identification model use different feature detectors. In some implementations, the first ROI identification model and the second ROI identification model are trained using different training data.

Figure 7:
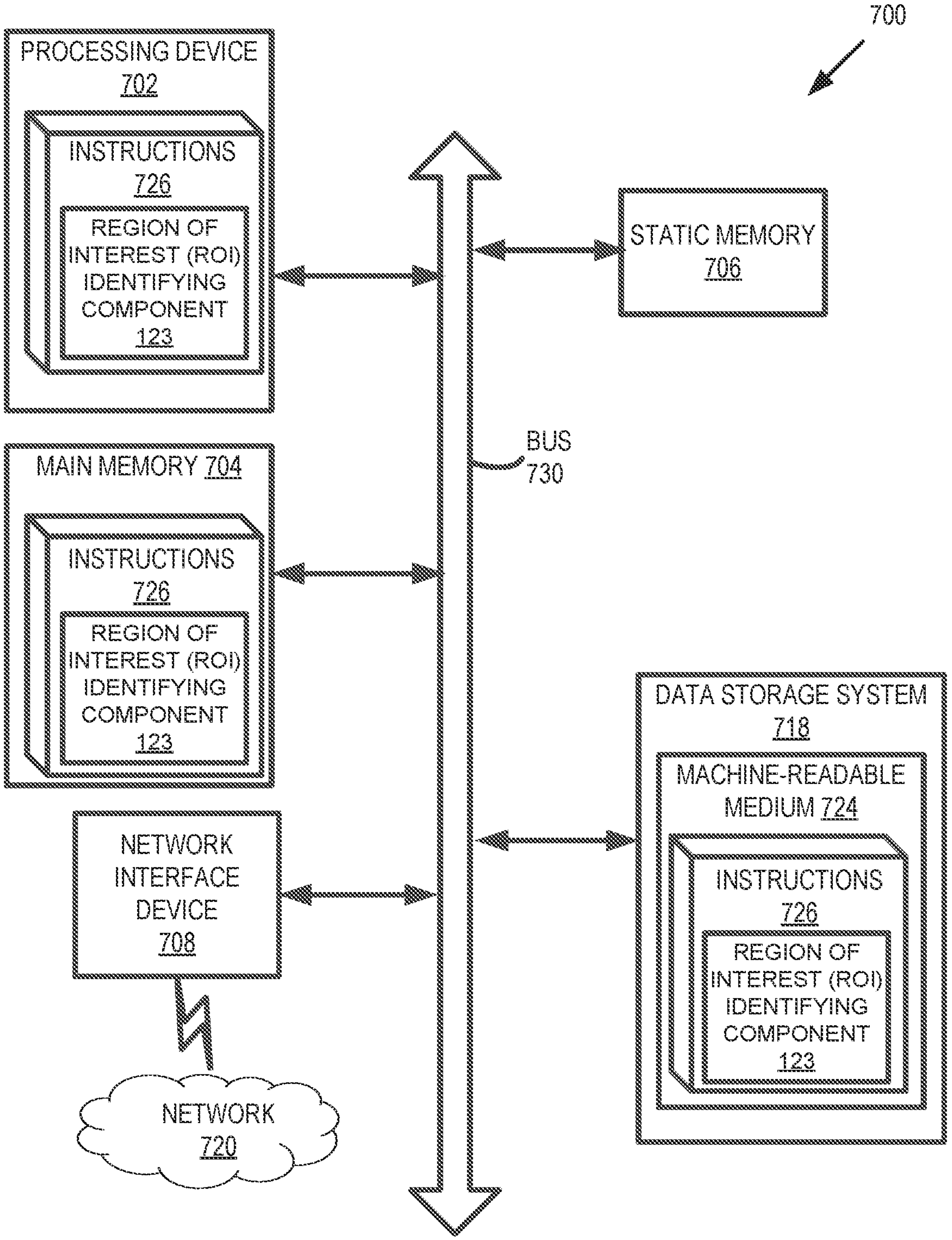
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system that includes, is coupled to, or utilizes a memory sub-system or can be used to perform the operations of a controller (e.g., to execute an operating system to perform operations corresponding to the ROI identifying component 123 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a non-transitory computer-readable storage medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to a same memory sub-system.

In one embodiment, the instructions 726 include instructions to implement functionality corresponding to the ROI identifying component 123 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the disclosure. The term "machine-readable storage medium" shall accordingly be taken to include, but not be limited to, solid-state memories, optical media, and magnetic media.

Some portions of the preceding detailed descriptions have been presented in terms of operations and symbolic representations of operations on data bits within a computer memory. These algorithmic descriptions and representations are the ways used by those skilled in the data processing arts to most effectively convey the substance of their work to others skilled in the art. An algorithm or operation is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms, operations, and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, which can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an embodiment" or "one embodiment" or the like throughout is not intended to mean the same embodiment or embodiment unless described as such. One or more embodiments or embodiments described herein may be combined in a particular embodiment or embodiment. The terms "first," "second," "third," "fourth," etc. as used herein are meant as labels to distinguish among different elements and may not necessarily have an ordinal meaning according to their numerical designation.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory; and a processing device, operatively coupled with the memory, to perform operations comprising:

receiving an image of a substrate of an electronic device, the image covering an area of the substrate, wherein a critical measurement of the substrate is calculated as an aggregated value over the area;

determining a plurality of candidate regions in the image based on sampling information associated with the critical measurement, wherein the sampling information specifies a plurality of sampling locations within the area, and wherein values measured at the plurality of sampling locations are used to calculate the aggregated value;

extracting, by a feature extraction model processing the image, a plurality of visual features from the image; and identifying, by a trainable feature classifier processing the plurality of visual features extracted by the feature extraction model, a region of interest among the plurality of candidate regions, the region of interest corresponding to an electronic circuit and associated with performance of the electronic circuit.

2. The system of claim 1, wherein the operations further comprise:

in view of the region of interest, identifying a defect that leads to a failure of the electronic device.

3. The system of claim 1, wherein the operations further comprise:

determining, by a trainable defect classification model processing a subset of the plurality of visual features associated with the region of interest, a type of a defect associated with the region of interest.

4. The system of claim 1, wherein the operations further comprise:

receiving a second image of the region of interest, wherein a resolution of the second image exceeds a resolution of the image of the substrate;

extracting, by a second feature extraction model processing the second image, a second plurality of visual features from the second image; and identifying, by a second trainable feature classifier processing the second plurality of visual features, a second region of interest corresponding to the electronic circuit associated with performance of the electronic circuit within the second image, wherein the second region of interest is a part of the region of interest.

5. The system of claim 4, wherein the operations further comprise:

determining, by a trainable defect classification model processing a subset of the second plurality of visual features associated with the second region of interest, a type of a defect associated with the second region of interest.

6. The system of claim 1, wherein the feature extraction model is trainable.

7. The system of claim 1, wherein the feature extraction model implements at least one of: Scale Invariant Feature Transform (SIFT), Speeded Up Robust Features (SURF), KAZE, Accelerated-KAZE (AKAZE), Oriented FAST and Rotated BRIEF (ORB), or Binary Robust Invariant Scalable Keypoints (BRISK).

8. The system of claim 1, wherein the trainable feature classifier implements at least one of: Perceptron, Naive Bayes, Decision Tree, Logistic Regression, K-Nearest Neighbor, Artificial Neural Networks, Deep Learning, or Support Vector Machine.

9. A non-transitory computer readable medium comprising instructions, which when executed by a processor, cause the processor to perform operations comprising:

receiving an image of a semiconductor substrate of an electronic device, the image covering an area of the substrate, wherein a critical measurement of the substrate is calculated as an aggregated value over the area;

determining a plurality of candidate regions in the image based on sampling information associated with the critical measurement, wherein the sampling information specifies a plurality of sampling locations within the area, and wherein values measured at the plurality of sampling locations are used to calculate the aggregated value;

extracting, by a feature extraction model processing the image, a plurality of visual features from the image; and identifying, by a trainable feature classifier processing the plurality of visual features extracted by the feature extraction model, a region of interest among the plurality of candidate regions, the region of interest corresponding to an electronic circuit exhibiting suboptimal performance.

10. The non-transitory computer readable medium of claim 9, wherein the operations further comprise:

preprocessing the image.

11. The non-transitory computer readable medium of claim 9, wherein the operations further comprise:

determining, by a trainable defect classification model processing a subset of the plurality of visual features associated with the region of interest, a type of a defect associated with the region of interest.

12. The non-transitory computer readable medium of claim 9, wherein the operations further comprise:

receiving a second image of the region of interest, wherein a resolution of the second image exceeds a resolution of the image of the semiconductor substrate;

extracting, by a second feature extraction model processing the second image, a second plurality of visual features from the second image; and identifying, by a second trainable feature classifier processing the second plurality of visual features, a second region of interest corresponding to an electronic circuit exhibiting suboptimal performance within the second image, wherein the second region of interest is a part of the region of interest.

13. The non-transitory computer readable medium of claim 12, wherein the image is received from a first imaging device, and the second image is received from a second imaging device.

14. The non-transitory computer readable medium of claim 12, wherein the feature extraction model and the second feature extraction model use different feature detectors.

15. The non-transitory computer readable medium of claim 12, wherein the trainable feature classifier and the second trainable feature classifier are trained using different training data.

16. The non-transitory computer readable medium of claim 12, wherein the trainable feature classifier and the second trainable feature classifier are trained using different machine learning techniques.

17. A method, comprising:

receiving, by a processing device, an image of a substrate of an electronic device, the image covering an area of the substrate, wherein a critical measurement of the substrate is calculated as an aggregated value over the area;

determining a plurality of candidate regions in the image based on sampling information associated with the critical measurement, wherein the sampling information specifies a plurality of sampling locations within the area, and wherein values measured at the plurality of sampling locations are used to calculate the aggregated value;

extracting, by a feature extraction model processing the image, a plurality of visual features from the image; and identifying, by a trainable feature classifier processing the plurality of visual features extracted by the feature extraction model, a region of interest among the plurality of candidate regions, the region of interest corresponding to an electronic circuit associated with performance of the electronic circuit.

18. The method of claim 17, wherein the feature extraction model comprises at least one of: Scale Invariant Feature Transform (SIFT), Speeded Up Robust Features (SURF), KAZE, Accelerated-KAZE (AKAZE), Oriented FAST and Rotated BRIEF (ORB), or Binary Robust Invariant Scalable Keypoints BRISK).

19. The method of claim 17, wherein the trainable feature classifier comprises at least one of: Perceptron, Naive Bayes, Decision Tree, Logistic Regression, K-Nearest Neighbor, Artificial Neural Networks, Deep Learning, or Support Vector Machine.

* * * * *